(12) United States Patent
Tsay et al.

(10) Patent No.: US 11,853,945 B2
(45) Date of Patent: Dec. 26, 2023

(54) DATA ANOMALY FORECASTING FROM DATA RECORD META-STATISTICS

(71) Applicant: S&P Global Inc., New York, NY (US)

(72) Inventors: Brian Tsay, Sunnyvale, CA (US);
Jason Prentice, Lexington, MA (US);
James Ryan Psota, Cambridge, MA (US)

(73) Assignee: S&P Global Inc., New York, NY (US)

( * ) Notice: Subject to any disclaimer, the term of this patent is extended or adjusted under 35 U.S.C. 154(b) by 35 days.

(21) Appl. No.: 17/443,859

(22) Filed: Jul. 28, 2021

(65) Prior Publication Data
US 2023/0036483 A1 Feb. 2, 2023

(51) Int. Cl.
*G06Q 10/0631* (2023.01)
*G06Q 10/04* (2023.01)

(52) U.S. Cl.
CPC ....... *G06Q 10/06315* (2013.01); *G06Q 10/04* (2013.01)

(58) Field of Classification Search
None
See application file for complete search history.

(56) References Cited

U.S. PATENT DOCUMENTS

| | | | | |
|---|---|---|---|---|
| 10,817,530 | B2 * | 10/2020 | Siebel | ...................... H04L 69/16 |
| 2009/0125350 | A1 * | 5/2009 | Lessing | .................. G06Q 10/08 |
| | | | | 705/7.12 |
| 2013/0211870 | A1 * | 8/2013 | Lawson | ................... H04L 43/14 |
| | | | | 705/7.25 |
| 2014/0310231 | A1 * | 10/2014 | Sampathkumaran | ........................ |
| | | | | G06F 16/254 |
| | | | | 707/602 |
| 2019/0354544 | A1 * | 11/2019 | Hertz | ....................... G06F 16/35 |
| 2020/0380417 | A1 * | 12/2020 | Briancon | ................ G06F 8/315 |

OTHER PUBLICATIONS

Akin Ateş, M., Suurmond, R., Luzzini, D. and Krause, D. (2022), Order from chaos: A meta-analysis of supply chain complexity and firm performance. J Supply Chain Manag, 58: 3-30. https://doi.org/10.1111/jscm.12264 (Year: 2022).*

* cited by examiner

*Primary Examiner* — Folashade Anderson
(74) *Attorney, Agent, or Firm* — Yee & Associates, P.C.

(57) ABSTRACT

A method, apparatus, system, and computer program code for forecasting a data anomaly to a supply chain. A plurality of data records is identified for a plurality of entities. The data records include import records and export records. The data fields in the data records are categorized into generic field types. The generic field types include numeric fields, categorical fields, and date fields. For each of the plurality of entities, an entity-specific model is constructed for forecasting imports and exports based on the generic field types. The entity-specific model for each of the plurality of entities is combined into a global supply chain model. Based on the global supply chain model, a data anomaly is forecast to a supply chain that is associated with a particular entity.

21 Claims, 8 Drawing Sheets

DATA ANOMALY FORECASTING FROM DATA RECORD META-STATISTICS

BACKGROUND

1. Field

The disclosure relates generally to an improved computer system and, more specifically, to a method, apparatus, computer system, and computer program product for forecasting a data anomaly to a supply chain.

2. Description of the Related Art

Effective supply chain management is becoming increasingly important in today's global economy which depends on goods transported in a global supply chain. Generally, a global supply chain is a network of international suppliers, manufacturers, distributors, and other entities that handle goods from their component parts to consumer consumption.

However, only limited information is timely available regarding the global flow of various commodities. Information regarding shipping traffic to and from various ports is typically gathered by port authorities and is often limited in terms data granularity and geographic scope. This high-level information may include verification that a container has arrived at or departed from a port but fail to provide an evaluation of the container's contents. Manufacturers relying on a global supply chain distribution may be unaware of disruptions until a discrepancy is determined at a local port.

SUMMARY

According to one embodiment of the present invention, a method provides for forecasting a data anomaly to a supply chain. The method includes identifying a plurality of data records for a plurality of entities. The data records include import records and export records. The method includes categorizing data fields in the data records into generic field types. The generic field types include numeric fields, categorical fields, and date fields. For each of the plurality of entities, an entity-specific model is constructed for forecasting imports and exports based on the generic field types. The entity-specific model for each of the plurality of entities is combined into a global supply chain model. Based on the global supply chain model, a data anomaly is forecast to a supply chain that is associated with a particular entity.

According to another embodiment of the present invention, a computer system comprises a hardware processor and a data quality engine in communication with the hardware processor period. The data quality engine is configured to identify a plurality of data records for a plurality of entities. The data records include import records and export records. the data quality engine is configured to categorize data fields in the data records into generic field types. The generic field types include numeric fields, categorical fields, and date fields. For each of the plurality of entities, the data quality engine is configured to construct an entity-specific model for forecasting imports and exports based on the generic field types. The data quality engine is configured to combine the entity-specific model for each of the plurality of entities into a global supply chain model. The data quality engine is configured to forecast, based on the global supply chain model, a data anomaly in a supply chain that is associated with a particular entity.

According to yet another embodiment of the present invention, a computer program product comprises a computer-readable storage media with program code stored on the computer-readable storage media forecasting a data anomaly to a supply chain. The program code is executable by a computer system: to identify a plurality of data records for a plurality of entities, the data records including import records and export records; to categorize data fields in the data records into generic field types, the generic field types including numeric fields, categorical fields, and date fields; to construct an entity-specific model, for each of the plurality of entities, for forecasting imports and exports based on the generic field types; to combine the entity-specific model for each of the plurality of entities into a global supply chain model; and to forecast, based on the global supply chain model, a data anomaly to a supply chain that is associated with a particular entity.

DETAILED DESCRIPTION

Figure 1:
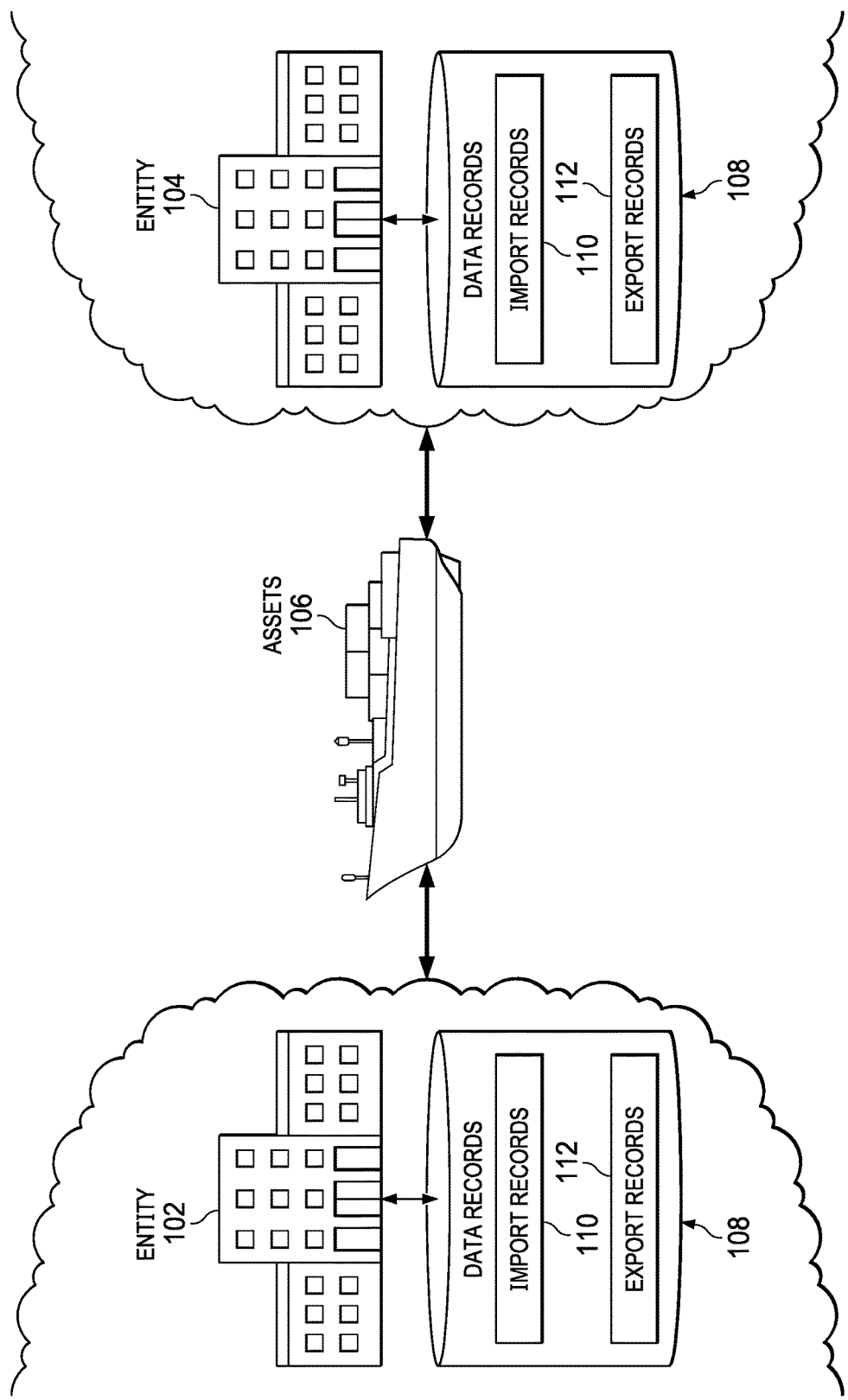
FIG. 1 is a pictorial representation of a global supply chain is depicted in accordance with an illustrated embodiment.

With reference now to the figures and, in particular, with reference to FIG. 1, a pictorial representation of a global supply chain is depicted in accordance with an illustrated embodiment. FIG. 1 illustrates an example of entity 102 and entity 104 interacting in a supply chain scenario. Assets 106 are shipped between entity 102 and entity 104. Entity 102 and entity 104 maintain data records 108, including both import records 110 and export records 112, that relate to the shipment of assets 106. Both entity 102 and entity 104 maintain import records 110 for assets arriving at the respective entity from a different entity. Similarly, both entity 102 and entity 104 maintain export records 112 for assets departing from the respective entity to a different entity.

Data records 108 are entity-specific. For example, import records 110 for entity 102 are for assets arriving at entity 102, and do not include data records 108 for assets arriving at entity 104. Similarly, export records 112 for entity 104 are for assets 106 departing from entity 104, and do not include data records 108 for assets 106 departing from entity 102.

Import records for one entity may correspond to the export records of another entity, based on assets shipped between the two entities. Therefore, a data anomaly, such as a disruption in the import and export of assets at a particular entity can have ripple effects across the global supply chain.

Figure 2:
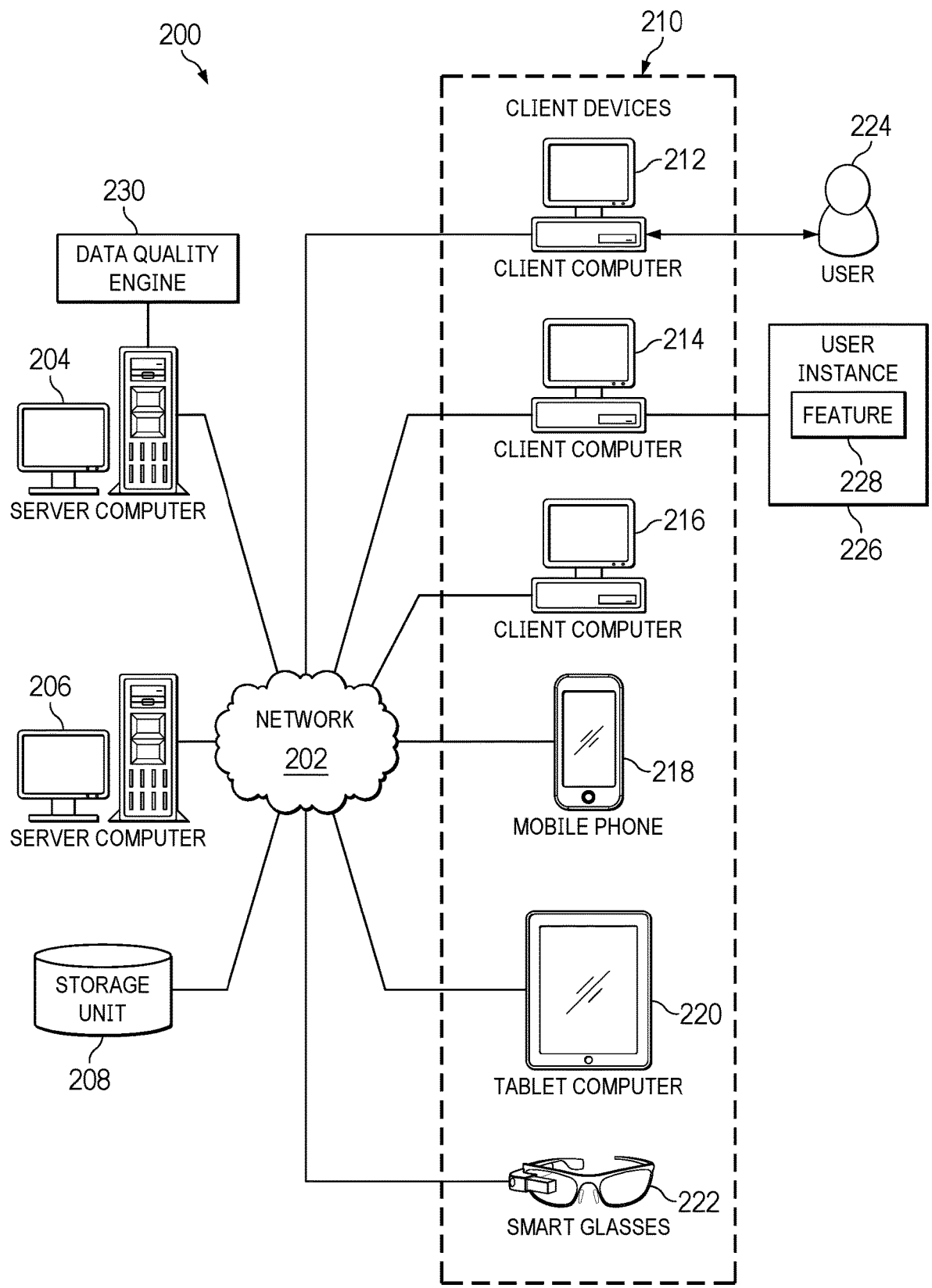
FIG. 2 is a pictorial representation of a network of data processing systems in which illustrative embodiments may be implemented.

Referring now to FIG. 2, a pictorial representation of a network of data processing systems is depicted in which illustrative embodiments may be implemented. Network data processing system 200 is a network of computers in which the illustrative embodiments may be implemented. Network data processing system 200 contains network 202, which is the medium used to provide communications links between various devices and computers connected together within network data processing system 200. Network 202 may include connections, such as wire, wireless communication links, or fiber optic cables.

In the depicted example, server computer 204 and server computer 206 connect to network 202 along with storage unit 208. In addition, client devices 210 connect to network 202. As depicted, client devices 210 include client computer 212, client computer 214, and client computer 216. Client devices 210 can be, for example, computers, workstations, or network computers. In the depicted example, server computer 204 provides information, such as boot files, operating system images, and applications to client devices 210. Further, client devices 210 can also include other types of client devices such as mobile phone 218, tablet computer 220, and smart glasses 222. In this illustrative example, server computer 204, server computer 206, storage unit 208, and client devices 210 are network devices that connect to network 202 in which network 202 is the communications media for these network devices. Some or all of client devices 210 may form an Internet of things (IoT) in which these physical devices can connect to network 202 and exchange information with each other over network 202.

Client devices 210 are clients to server computer 204 in this example. Network data processing system 200 may include additional server computers, client computers, and other devices not shown. Client devices 210 connect to network 202 utilizing at least one of wired, optical fiber, or wireless connections.

Program code located in network data processing system 200 can be stored on a computer-recordable storage media and downloaded to a data processing system or other device for use. For example, the program code can be stored on a computer-recordable storage media on server computer 204 and downloaded to client devices 210 over network 202 for use on client devices 210.

In the depicted example, network data processing system 200 is the Internet with network 202 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational, and other computer systems that route data and messages. Of course, network data processing system 200 also may be implemented using a number of different types of networks. For example, network 202 can be comprised of at least one of the Internet, an intranet, a local area network (LAN), a metropolitan area network (MAN), or a wide area network (WAN). FIG. 2 is intended as an example, and not as an architectural limitation for the different illustrative embodiments.

As used herein, a "number of," when used with reference to items, means one or more items. For example, a "number of different types of networks" is one or more different types of networks.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

In the illustrative example, user 224 operates client computer 212. As depicted, user instance 226 of an application runs on client computer 214. User 224 can request guidance in using feature 228 in user instance 226 of the application. In the illustrative example, data quality engine 230 can operate to forecast a data anomaly to a supply chain.

In this illustrative example, data quality engine 230 can run on client computer 214 and can take the form of a system instance of the application. In another illustrative example, data quality engine 230 can be run in a remote location such as on server computer 204. In yet other illustrative examples, data quality engine 230 can be distributed in multiple locations within network data processing system 200. For example, data quality engine 230 can run on client computer 212 and on client computer 214 or on client computer 212 and server computer 204 depending on the particular implementation.

Data quality engine 230 can operate to forecast data source anomalies—major changes in a data source on a file-by-file basis. The forecasted anomalies reports can serve as a guide for potential data issues. Data quality engine 230 uses a common set of general methods to calculate statistics for different data sources and the data fields therein. Data quality engine 230 can therefore categorize data fields into generic types, with the method only knowing the "type" of the data field.

Figure 3:
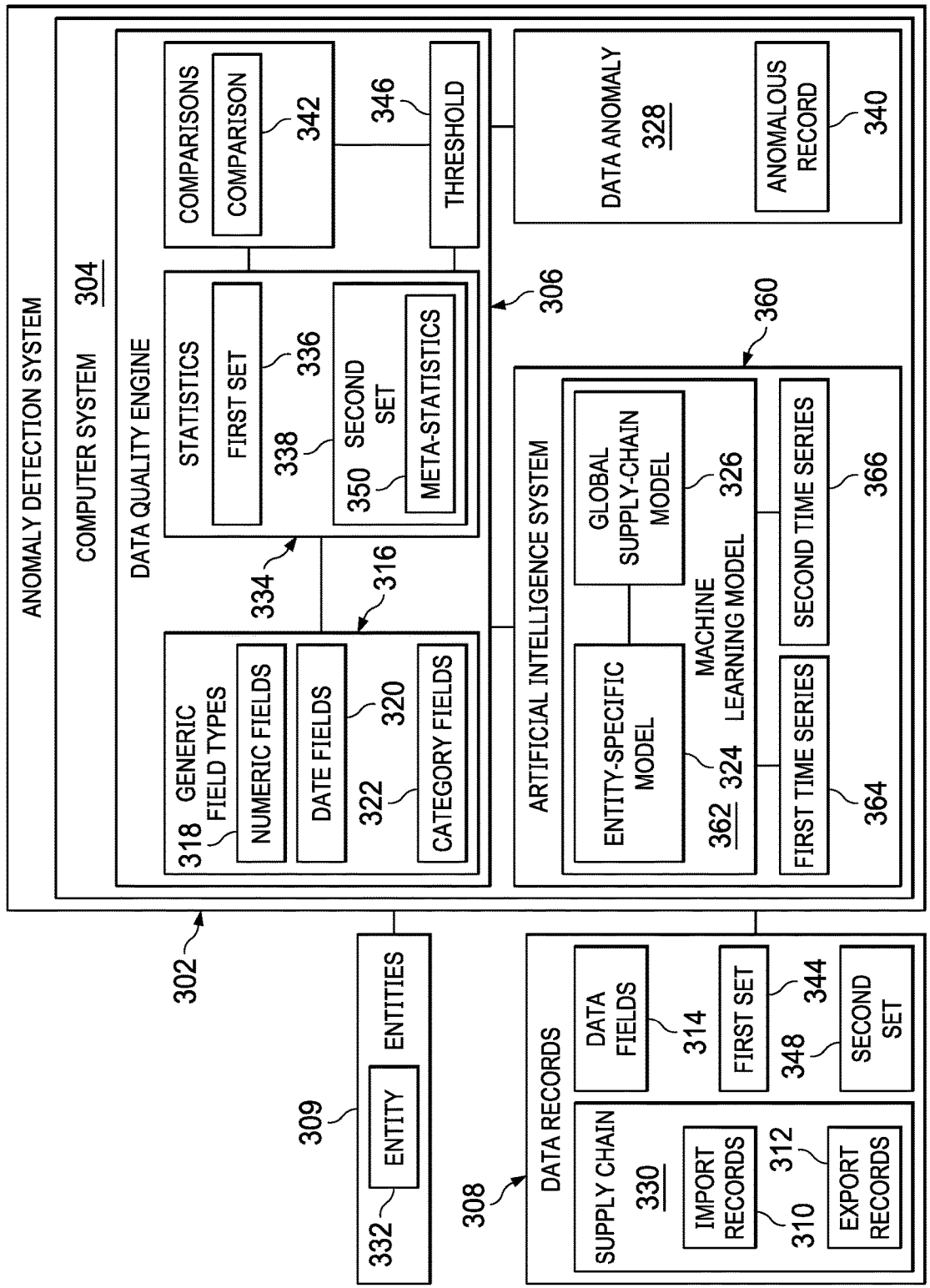
FIG. 3 is a block diagram of an anomaly detection environment in accordance with an illustrative embodiment.

With reference now to FIG. 3, a block diagram of an anomaly detection environment is depicted in accordance with an illustrative embodiment. In this illustrative example, anomaly detection environment 300 includes components that can be implemented in hardware such as the hardware shown in network data processing system 200 in FIG. 2.

In this illustrative example, anomaly detection system 302 in application environment 300 can operate to forecast data anomalies to a supply chain. For example, anomaly detection system 302 can generate comparisons of data records showing major changes in a data source on a file-by-file basis. For certain data sources, this means generating reports for day-to-day comparisons. Day-to-day comparisons are naturally more volatile, as compared to, for example, month-to-month. This volatility also results in records that may appear anomalous if data source files cover different time spans in different files. Anomaly detection system 302 provides a file-by-file checker, independent of the time period that a file may represent. In this manner, anomaly detection system 302 is able to link errors introduced by different entities to individual data files, rather than to a particular time period of coverage.

According to an illustrative embodiment of the present invention, anomaly detection system 302 forecasts a data anomaly to a supply chain. A plurality of data records is identified for a plurality of entities. The data records include import records and export records. The data fields in the data records are categorized into generic field types. The generic field types include numeric fields, categorical fields, and date fields. For each of the plurality of entities, an entity-specific model is constructed for forecasting imports and exports based on the generic field types. The entity-specific model for each of the plurality of entities is combined into a global supply chain model. Based on the global supply chain model, a data anomaly is forecast to a supply chain that is associated with a particular entity.

As depicted, anomaly detection system 302 comprises computer system 304 and data quality engine 306. data quality engine 306 runs in computer system 304. data quality engine 306 can be implemented in software, hardware, firmware, or a combination thereof. When software is used, the operations performed by data quality engine 306 can be implemented in program code configured to run on hardware, such as a processor unit. When firmware is used, the operations performed by data quality engine 306 can be implemented in program code and data and stored in persistent memory to run on a processor unit. When hardware is employed, the hardware may include circuits that operate to perform the operations in data quality engine 306.

In the illustrative examples, the hardware may take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

Computer system 304 is a physical hardware system and includes one or more data processing systems. When more than one data processing system is present in computer system 304, those data processing systems are in communication with each other using a communications medium. The communications medium can be a network. The data processing systems can be selected from at least one of a computer, a server computer, a tablet computer, or some other suitable data processing system.

In this illustrative example, data quality engine 306 in computer system 304 is configured to identify a plurality of data records 308 for a plurality of entities 309. Data records 308 can include import records 310 and export records 312.

Data quality engine 306 categorizes data fields 314 in the data records 308 into generic field types 316. The generic field types 316 including numeric fields 318, categorical fields 320, and date fields 322;

In one illustrative example, data quality engine 306 determines a cardinality of data fields 314, thereby distinguishing between numeric, categorical, and text variables depends on having a sense of the number of unique values a field can take. For example, data quality engine 306 could utilize a SQL function, such as SELECT COUNT(DISTINCT) over the fields, that returns a count of number rows with different non-NULL expr values. While this function would provide an accurate measure of cardinality, running the function could be time-prohibitive given the number of data sources and fields. To more quickly distinguish between numeric, categorical, and text variables, data quality engine 306 leverages statistical data that has already been collected by the database about the contents of the database to get a rough sense of the cardinality. However, because these statistics are not 100% accurate, classification can result in misclassification of the data fields.

For example, certain fields, such as Harmonized System (HS) codes, are stored in a data record as a numeric variable but should be treated as categorical. Conversely, free text fields, such as shipment descriptions, should not be treated as categorical.

Therefore, data quality engine 306 determines generic field types 316 by looking at a combination of how the field is stored in the relational database management system (RDBMS), for example, a field type, and an estimation of how many unique values there are in that field.

For each of the plurality of entities 309, data quality engine 306 constructs an entity-specific model 324 for forecasting import records 310 and export records 312 based on the generic field types 316. Entity-specific model 324 is a model for predicting data anomalies occurring at a single entity, such as one of entities 102 or 104 of FIG. 1. Data quality engine 306 can then combine the entity-specific model 324 for each of the plurality of entities 309 into a global supply chain model 326. Based on the global supply chain model 326, data quality engine 306 forecasts a data anomaly 328 to a supply chain 330 that is associated with a particular entity 332.

In one illustrative example, data quality engine 306 constructs the entity-specific model 324 by generating a first set 336 of statistics 334 about a data fields 314 from the plurality of data records 308. Data quality engine 306 controls the data quality of the data records 308 by identifying an anomalous record 340 in plurality of data records 308. In one illustrative example, data quality engine 306 identifies an anomalous record 340 by generating a comparison 342 based on the first set 336 of statistics 334 and a first set 344 of data records 308.

Data quality engine 306 rejects the first set 344 of data records 308 as an anomalous record 340 when the comparison 342 exceeds a threshold 346. Threshold 346 is based on statistics derived from the plurality of data records 308. For example, data quality engine 306 may reject first set of data records 308 if the statistic is more than 3 standard deviations away from a mean of the statistic derived from the plurality of data records 308.

In one or more illustrative embodiments, the sensitivity of what data quality engine 306 considers an anomalous record can be controlled by adjusting the threshold 346. Comparison 342 may ignore certain fields in data records 308, regardless of how far the statistic is from the mean, by adding the undesired fields to an ignore parameter, such as in an array of strings, taken into account by data quality engine 306 when generating comparison 342. Conversely, data quality engine 306 may limit comparison 342 to only a subset of fields by adding the undesired fields to an include parameter, such as in an array of strings, taken into account by data quality engine 306 when generating comparison 342.

Data quality engine 306 replacing the first set 336 of statistics 334 with a second set 338 of statistics 334 to compare with a second set 348 of data records 308. Second set 338 of statistics 334 can be meta-statistics 350. Meta-statistics 350 are statistics about first set 336 of statistics 334. By comparing data records 308 based on meta statistics 350, data quality engine 306 eliminates or reduces a number of false positive of data anomalies 328. In other words, data quality engine 306 controls the data quality of the data records 308 by generating a set of meta-statistics 350 according to a generic field types 316 and generating the comparison 342 based on the set of meta-statistics 350 and the first set of data records 308.

Comparisons generated based on the set of meta-statistics 350 controls false positive rates to identify the anomalous record more accurately 340. The usage of meta-statistics 350 enables data quality engine 306 to dynamically determine threshold 346 with reduced manual input. In other words, data quality engine 306 dynamically derives threshold 346 from the distribution of meta-statistics 350, enabling a more accurate determination of anomalous record 340 with fewer false positives.

As stated above, second set 338 of statistics 334 are statistics about first set 336 of statistics 334. In one illustrative example, numeric fields 318 for the second set 338 of statistics 334 can include a percentile change for values of data fields 314 from the first data record 344 to the second data record 348. This measure tracks the maximum distance between the percentiles of the numeric fields in the two files being compared. For example, for a given data value of "10," a first data record has that value at a 50th percentile, while a second data record has that value at a 70th percentile. If this is the maximum difference among percentiles, the percentile change meta-statistic would be "20."

In one illustrative example, for numeric fields 318, the second set 338 of statistics 334 can include a percent change in a median for a data field 314 from the first data record 344 to the second data record 348. This measure tracks the distance between mean values of the numeric fields in the two files being compared. For example, for a first data record having a mean data value of "50," and a second data record that a mean data value of "70,". If this is the maximum difference among percentiles, the percent change in median meta-statistic would be "20."

In one illustrative example, for numeric fields 318, the second set 338 of statistics 334 can include a maximum difference for a data field 314 from the first data record 344 to the second data record 348; This is the difference between the maximum value of the field in one file versus the maximum value in another file. This maximum difference meta-statistic can be used as an indirect proxy for when an anomalously high value appears in one of the files.

In one illustrative example, for numeric fields 318, the second set 338 of statistics 334 can include a minimum difference for a data field 314 from the first data record 344 to the second data record 348; This is the difference between the minimum value of the field in one file versus the minimum value in another file. This minimum difference meta-statistic can be used as an indirect proxy for when an anomalously low value appears in one of the files.

In one illustrative example, for numeric fields 318, the second set 338 of statistics 334 can include negative values for a data field 314 from the first data record 344 to the second data record 348; The negative values meta-statistic is not a change measure, but instead checks the numeric fields in both files to see whether there are any negative values present.

The second set of statistics 338 can include meta statistics 350 about categorical fields 320. In one illustrative example, for categorical fields 320, the second set of statistics 338 can include a percentage change in a number of categorical fields 320 from the first data record 344 to the second data record 348. This percentage change meta-statistic can be used as an indirect proxy for when an anomalous deviation in the number of data fields appears in one of the files.

In one illustrative example, for categorical fields 320, the second set of statistics 338 can include a percent agreement in categorical fields 320 between the first data record 344 and the second data record 348. This percent agreement meta-statistic checks to see whether the most common categories of a field in one file are the same as in the other file. This percent agreement meta-statistic can be determined for a different number of common categories, such as for a percent agreement among a top 3, top 5, top 10, or any other number of common categories.

In one illustrative example, for categorical fields 320, the second set of statistics 338 can include a percentage of missing categorical fields 320 between the first data record 344 and the second data record 348. This percentage of missing fields meta-statistic can include two measures: a first percentage measure of categories found in the field in a first file but are not found in a second file; and a second percentage measure of categories found in the field in the second file but are not found in the first file. This meta-statistic can also include what percentage of rows in the corresponding files belong to the missing categories.

In one illustrative example, for categorical fields 320, the second set of statistics 338 can include a modified chi-squared ratio for categorical fields 320. The modified chi-squared ratio meta-statistic is meant to measure changes in the distribution of the categorical field between the two files.

The typical chi-squared statistic is measured by:

$$x^2 = \sum \frac{(O_i - E_i)^2}{E_i} \qquad \text{Eq. 1}$$

Wherein:
$x^2$ is the chi-squared value;
O is the observed value; and
E is the expected value.

However, many data files include categories of data fields that, while present in one file, are completely missing from other files. If this missing category, i.e., i, happens to be in a file that constitutes a "baseline file", i.e., E, then the expected $E_i$ for the missing category is 0, giving a chi-squared value of infinity.

In the extreme case of the original file missing a very small, rare category found in the second file, this would result in a large statistic for 3 distributions which were possibly not all that different—a false positive. Since the number of observations in each comparison is quite large, standard Null Hypothesis Significance Testing (NHST) using a p-value to make a binary decision on whether an effect is real or not is not helpful.

To address these shortcomings, data quality engine 206 uses a modified chi-squared ratio meta-statistic that calculates the chi-squared statistic only over categories that exist in the "baseline" file, i.e, $E_i \neq 0$. A normalization factor is also applied modified so that statistics from different files will be on more similar scales The modified chi-squared meta-statistic determined by:

$$m^2 = \frac{1}{D} \sum \frac{(O_i - E_i)^2}{E_i} \qquad \text{Eq. 2}$$

Wherein:
$m^2$ is the modified chi-squared value;
O is the observed value;
E is the expected value; and
D is the degrees of freedom.
The degrees of freedom D can be determined by:

$$D = (r-1)(c-1) \qquad \text{Eq. 3}$$

Wherein:
D is the degrees of freedom;
r is the number of rows; and
c is the number of columns.

A threshold can be set for how high the modified chi-squared meta-statistic must be before concluding two distributions are separate. The default threshold can be, for example, more than 3 standard deviations away from the mean of the statistic derived from previous anomaly reports. The thresholds at which to conclude that the two distributions are separate is also adjustable.

In some illustrative examples, data quality engine 306 can use artificial intelligence system 360. Artificial intelligence system 360 is a system that has intelligent behavior and can be based on the function of a human brain. An artificial intelligence system comprises at least one of an artificial neural network, a cognitive system, a Bayesian network, a fuzzy logic, an expert system, a natural language system, or some other suitable system. Machine learning is used to train the artificial intelligence system. Machine learning involves inputting data to the process and allowing the process to adjust and improve the function of the artificial intelligence system.

In this illustrative example, artificial intelligence system 360 can include a set of machine learning models 362. A machine learning model is a type of artificial intelligence model that can learn without being explicitly programmed. A machine learning model can learn based on training data input into the machine learning model. The machine learning model can learn using various types of machine learning algorithms. The machine learning algorithms include at least one of a supervised learning, an unsupervised learning, a feature learning, a sparse dictionary learning, and anomaly detection, association rules, or other types of learning algorithms. Examples of machine learning models include an artificial neural network, a decision tree, a support vector machine, a Bayesian network, a genetic algorithm, and other types of models. These machine learning models can be trained using data and process additional data to provide a desired output.

In one illustrative example, constructing the entity-specific model 224 further comprises generating a first time series 364 of the import records 310 for the particular entity 332 according to the date fields 322 therein.

In this illustrative example, constructing the entity-specific model 224 further comprises training a first machine learning model 362 on the first time series 364 for the particular entity 332 and comparisons of a first set 336 of statistics about data fields 314 in the import records 310 for the particular entity 332.

In one illustrative example, combining the entity-specific model 324 for each of the plurality of entities 309 into a global supply chain model 326 further comprises generating a second time series 366 of the export records 312 for each of the plurality of entities 309. The second time series 366 is generated according to the date fields 322 identified in the export records 312.

In this illustrative example, a second machine learning model 362 is trained for each of the plurality of entities 309. A second machine learning model 362 is trained on the second time series 366 for the plurality of entities 309, as well as comparisons of a second set 338 of statistics 334 about data fields 314 in the export records 312 for the plurality of entities 309. The global supply chain model 326 can then be generated by externally regressing the first machine learning model 362 for the particular entity 332 with the second machine learning model 362 for the plurality of entities 309.

In one illustrative example, one or more solutions are present that overcome a problem with forecasting a data anomaly to a supply chain. As a result, one or more illustrative examples may forecast a data anomaly to a supply chain using one or more machine learning models trained based on meta-statistics derived from the import records and export records for a plurality of entities. The data anomalies are determined in a manner that controls false positive rates to identify an anomalous record more accurately.

Computer system 304 can be configured to perform at least one of the steps, operations, or actions described in the different illustrative examples using software, hardware, firmware, or a combination thereof. As a result, computer system 304 operates as a special purpose computer system in data quality engine 306 in computer system 304. In particular, data quality engine 306 transforms computer system 304 into a special purpose computer system as compared to currently available general computer systems that do not have data quality engine 306. In this example, computer system 304 operates as a tool that can increase at least one of speed, accuracy, or usability of computer system 304. In particular, this increase in performance of computer system 304 can be for the use of user instance 310 of application 312 by user 304. In one illustrative example, data quality engine 306 provides for more accurately identifying supply chain disruptions by controlling data quality of records used to train machine learning models, thereby reducing a number of false positives, as compared with using current anomaly detection systems.

The illustration of application environment 300 in FIG. 3 is not meant to imply physical or architectural limitations to the manner in which an illustrative embodiment can be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

Figure 4:
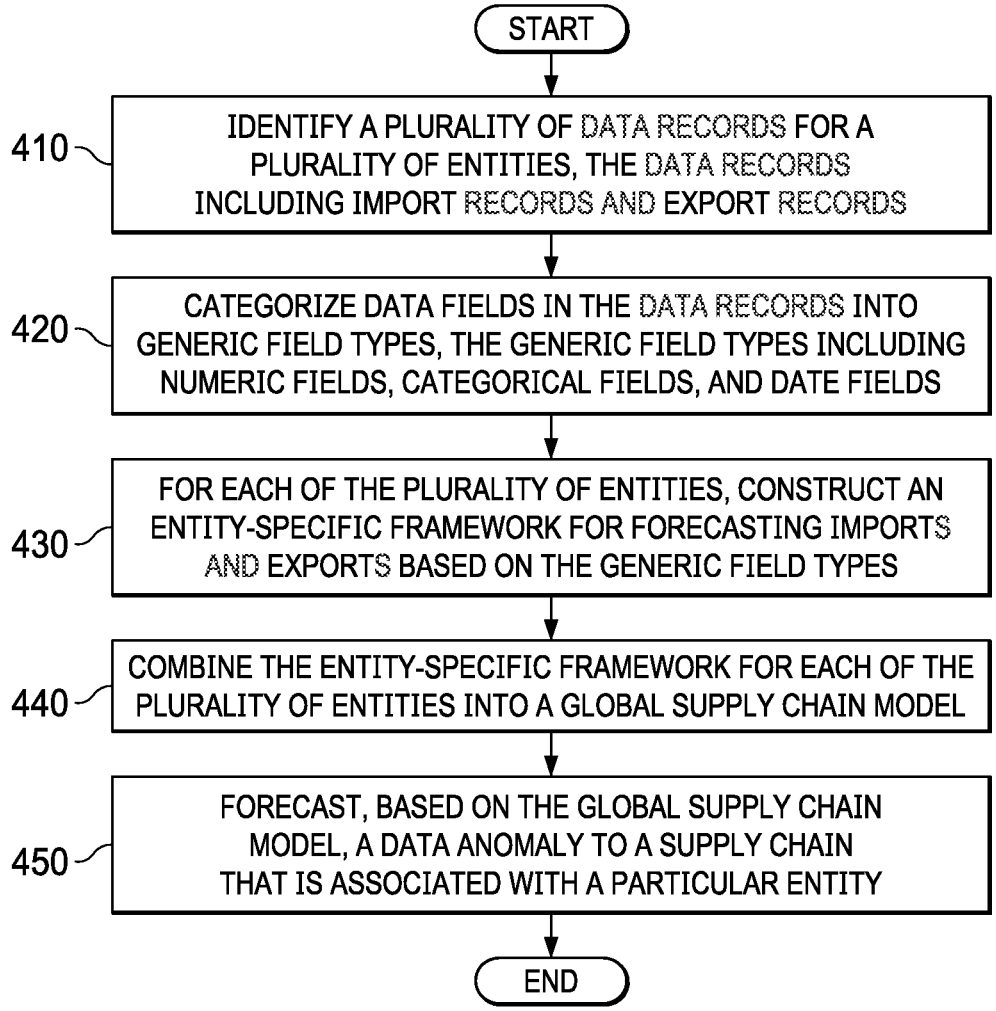
FIG. 4 is a flowchart of a process for forecasting a data anomaly to a supply chain depicted in accordance with an illustrative embodiment.

Turning next to FIG. 4, a flowchart of a process for forecasting a data anomaly to a supply chain is depicted in accordance with an illustrative embodiment. The process in FIG. 6 can be implemented in hardware, software, or both. When implemented in software, the process can take the form of program code that is run by one or more processor units located in one or more hardware devices in one or more computer systems. For example, the process can be implemented in data quality engine 306 in computer system 304 in FIG. 3.

The process begins by identifying a plurality of data records for a plurality of entities, including import records and export records (step 410). The process categorizes data fields in the data records into generic field types, the generic field types including numeric fields, categorical fields, and date fields (step 420).

For each of the plurality of entities, an entity-specific model is constructed for forecasting imports and exports based on the generic field types (step 430). The entity-specific model can be constructed using an artificial intelligence system that employs one or more machine learning models, such as artificial intelligence system 360 of FIG. 3.

The process combines the entity-specific model for each of the plurality of entities into a global supply chain model (step 440). Based on the global supply chain model, the process forecasts a data anomaly to a supply chain that is associated with a particular entity (step 450). The process terminates thereafter.

Figure 5:
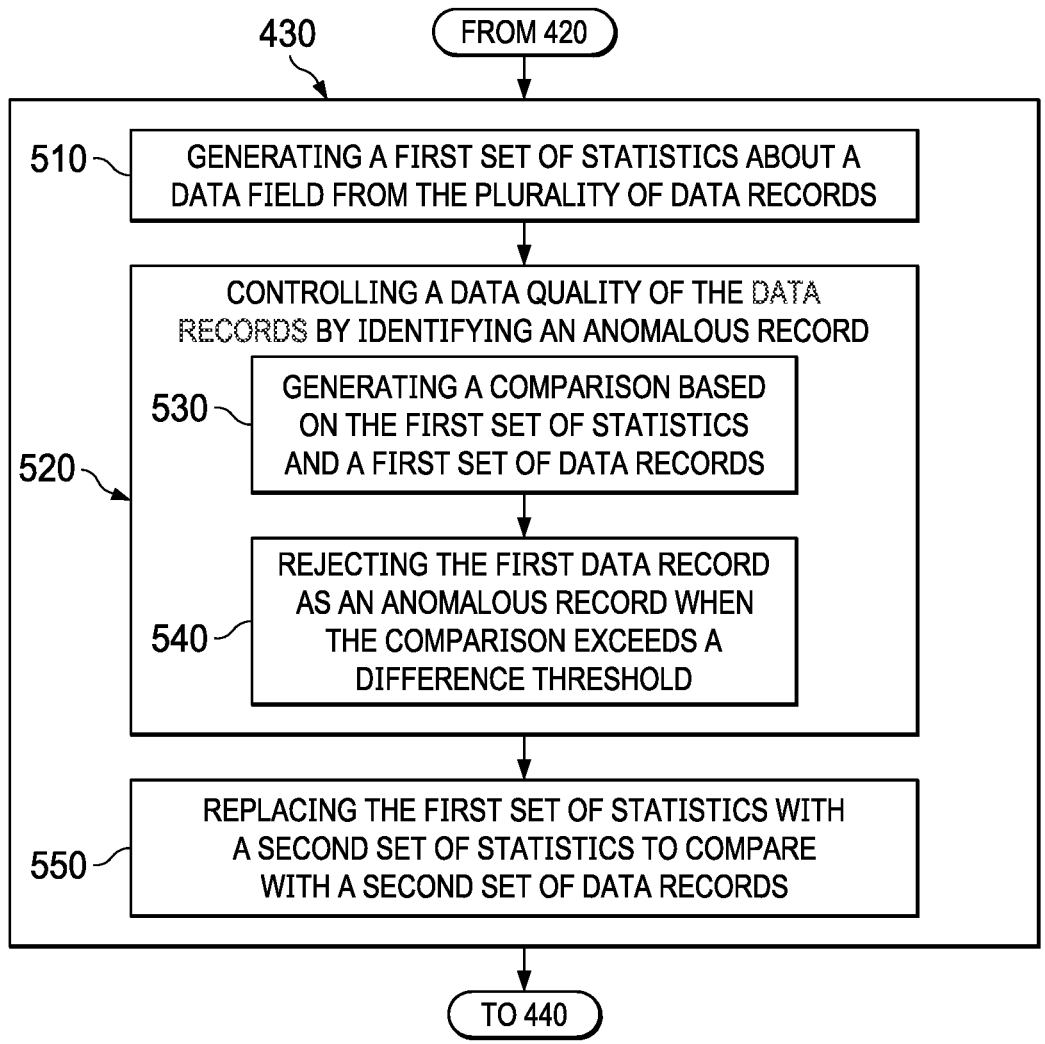
FIG. 5 is a process for constructing an entity-specific model depicted in accordance with an illustrative embodiment.

With reference next to FIG. 5, a process for constructing an entity-specific model is depicted in accordance with an illustrative embodiment. The process in FIG. 5 is an example of one implementation for step 430 in FIG. 4.

Continuing from stop 420 of FIG. 4, the process generates a first set of statistics about a data fields from the plurality of data records (step 510). The process controls a data quality of the data records by identifying an anomalous record (step 520).

In this illustrative example, controlling the data quality can include generating a comparison based on the first set of statistics and a first set of data records (step 530). When the comparison exceeds a difference threshold call movie process can reject the first data record as an anomalous record (step 540).

The process replaces the first set of statistics with a second set of statistics to compare with a second set of data records (step 550). The process terminates thereafter.

Figure 6:
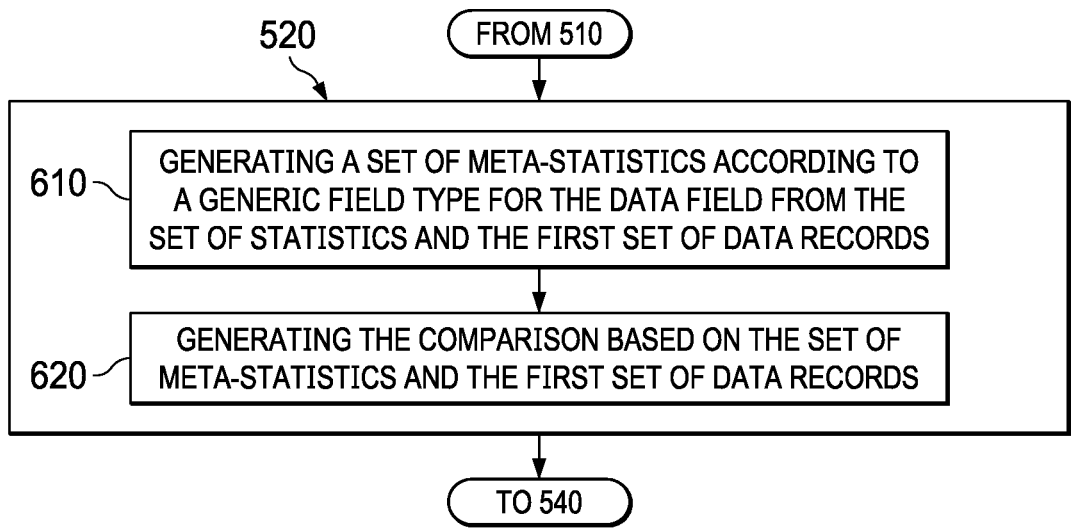
FIG. 6 is a process for controlling the data quality of the data records depicted in accordance with an illustrative embodiment.

With reference next to FIG. 6, a process for controlling the data quality of the data records is depicted in accordance with an illustrative embodiment. The process in FIG. 6 is an example of one implementation for step 520 in FIG. 4.

Continuing from step 510 of FIG. 5, the process generates a set of meta-statistics according to a generic field type for the data field from the set of statistics and the first set of data records (step 610). The process generates the comparison based on the set of meta-statistics and the first set of data records, wherein comparisons generated based on the set of meta-statistics controls false positive rates to identify the anomalous record (step 620) more accurately. Thereafter, the process continues to step 540 of FIG. 5.

Figure 7:
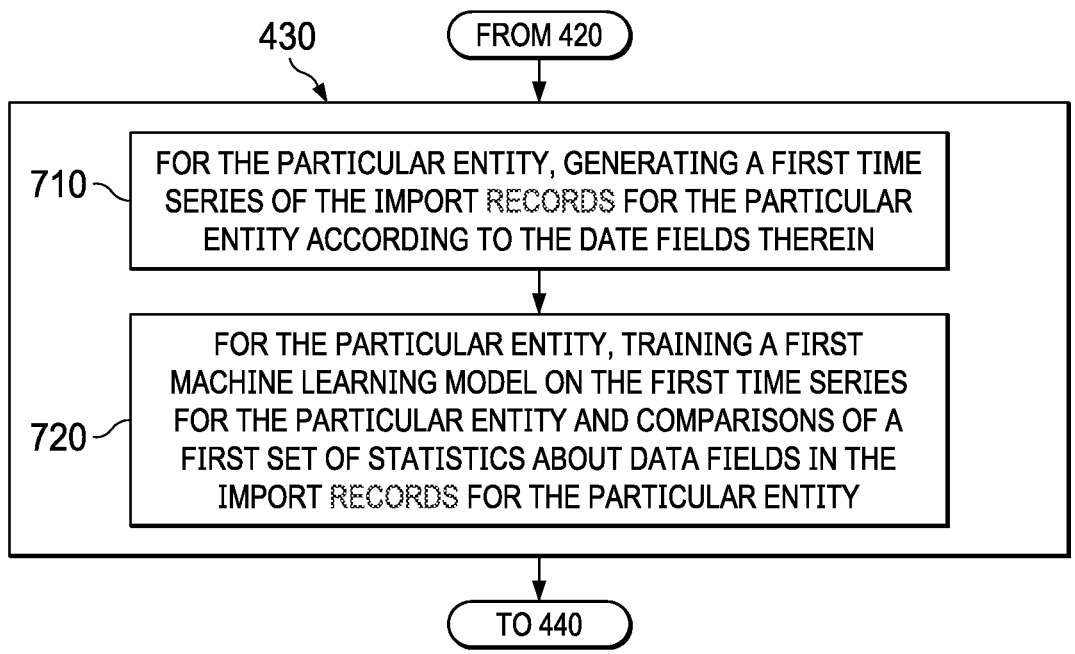
FIG. 7 is a process for constructing the entity-specific model depicted in accordance with an illustrative embodiment.

With reference next to FIG. 7, a process for constructing the entity-specific model is depicted in accordance with an illustrative embodiment. The process in FIG. 7 is an example of one implementation for step 430 in FIG. 4.

Continuing from step 420 of FIG. 4, for the particular entity, reprocessed generates a first time series of the import records for the particular entity according to the date fields therein (step 710). The process trains a first machine learning model on the first time series for the particular entity and comparisons of a first set of statistics about data fields in the import records for the particular entity (step 720). Thereafter, the process continues to step 440 of FIG. 4.

Figure 8:
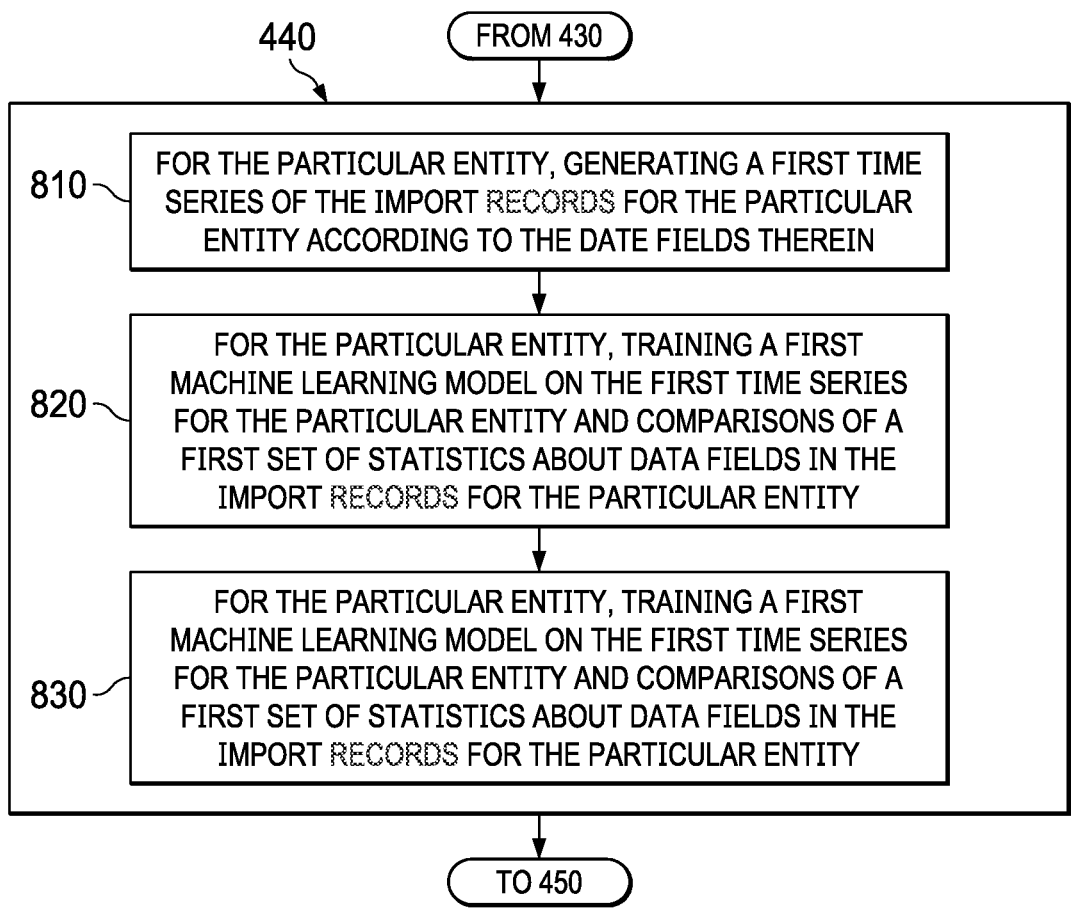
FIG. 8 is a process for combining the entity-specific model for each of the plurality of entities into a global supply chain model depicted in accordance with an illustrative embodiment.

With reference next to FIG. 8, a process for combining the entity-specific model for each of the plurality of entities into a global supply chain model is depicted in accordance with an illustrative embodiment. The process in FIG. 8 is an example of one implementation for step 440 in FIG. 6.

Continuing from step 430 of FIG. 4, for each of the plurality of entities, the process generates a second time series of the export records according to the date fields therein (step 810). For each of the plurality of entities, the process trains a second machine learning model on the second time series for the plurality of entities and comparisons of a second set of statistics about data fields in the export records for the plurality of entities (step 820).

The process generates the global supply chain model by externally regressing the first machine learning model for the particular entity with the second machine learning model for the plurality of entities (step 830). Thereafter, the process continues to step 450 of FIG. 4.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks can be implemented as program code, hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams can be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession can be performed substantially concurrently, or the blocks may sometimes be performed in the reverse order, depending upon the functionality involved. Also, other blocks can be added in addition to the illustrated blocks in a flowchart or block diagram.

Figure 9:
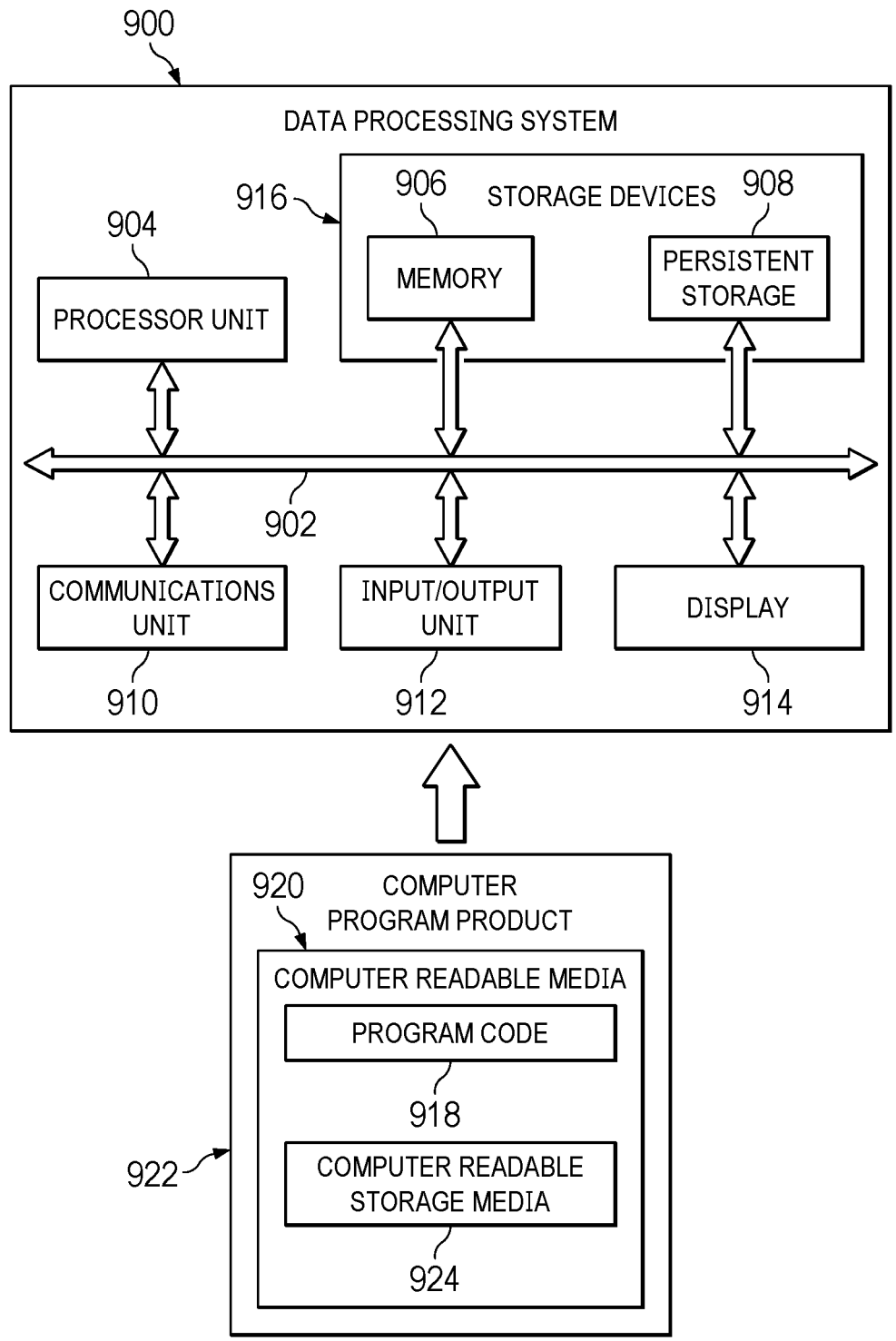
FIG. 9 is a block diagram of a data processing system in accordance with an illustrative embodiment.

Turning now to FIG. 9, a block diagram of a data processing system is depicted in accordance with an illustrative embodiment. Data processing system 900 can be used to implement server computer 204, server computer 206, client devices 910, in FIG. 2. Data processing system 900 can also be used to implement computer system 304 in FIG. 3. In this illustrative example, data processing system 900 includes communications framework 902, which provides communications between processor unit 904, memory 906, persistent storage 908, communications unit 910, input/output (I/O) unit 912, and display 914. In this example, communications framework 902 takes the form of a bus system.

Processor unit 904 serves to execute instructions for software that can be loaded into memory 906. Processor unit 904 includes one or more processors. For example, processor unit 904 can be selected from at least one of a multicore processor, a central processing unit (CPU), a graphics processing unit (GPU), a physics processing unit (PPU), a digital signal processor (DSP), a network processor, or some other suitable type of processor. Further, processor unit 904 can may be implemented using one or more heterogeneous processor systems in which a main processor is present with secondary processors on a single chip. As another illustrative example, processor unit 904 can be a symmetric multiprocessor system containing multiple processors of the same type on a single chip.

Memory 906 and persistent storage 908 are examples of storage devices 916. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 916 may also be referred to as computer-readable storage devices in these illustrative examples. Memory 906, in these examples, can be, for example, a random-access memory or any other suitable volatile or non-volatile storage device. Persistent storage 908 may take various forms, depending on the particular implementation.

For example, persistent storage 908 may contain one or more components or devices. For example, persistent storage 908 can be a hard drive, a solid-state drive (SSD), a flash memory, a rewritable optical disk, a rewritable magnetic tape, or some combination of the above. The media used by persistent storage 908 also can be removable. For example, a removable hard drive can be used for persistent storage 908.

Communications unit 910, in these illustrative examples, provides for communications with other data processing systems or devices. In these illustrative examples, communications unit 910 is a network interface card.

Input/output unit 912 allows for input and output of data with other devices that can be connected to data processing system 900. For example, input/output unit 912 may provide a connection for user input through at least one of a keyboard, a mouse, or some other suitable input device. Further, input/output unit 912 may send output to a printer. Display 914 provides a mechanism to display information to a user.

Instructions for at least one of the operating system, applications, or programs can be located in storage devices 916, which are in communication with processor unit 904 through communications framework 902. The processes of the different embodiments can be performed by processor unit 904 using computer-implemented instructions, which may be located in a memory, such as memory 906.

These instructions are program instructions and are also referred are referred to as program code, computer usable program code, or computer-readable program code that can be read and executed by a processor in processor unit 904. The program code in the different embodiments can be embodied on different physical or computer-readable storage media, such as memory 906 or persistent storage 908.

Program code 918 is located in a functional form on computer-readable media 920 that is selectively removable and can be loaded onto or transferred to data processing system 900 for execution by processor unit 904. Program code 918 and computer-readable media 920 form computer program product 922 in these illustrative examples. In the illustrative example, computer-readable media 920 is computer-readable storage media 924.

In these illustrative examples, computer-readable storage media 924 is a physical or tangible storage device used to store program code 918 rather than a medium that propagates or transmits program code 918. Computer-readable storage media 924, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. The term "non-transitory" or "tangible", as used herein, is a limitation of the medium itself (i.e., tangible, not a signal) as opposed to a limitation on data storage persistency (e.g., RAM vs. ROM).

Alternatively, program code 918 can be transferred to data processing system 900 using a computer-readable signal media. The computer-readable signal media are signals and can be, for example, a propagated data signal containing program code 918. For example, the computer-readable signal media can be at least one of an electromagnetic signal, an optical signal, or any other suitable type of signal. These signals can be transmitted over connections, such as wireless connections, optical fiber cable, coaxial cable, a wire, or any other suitable type of connection.

Further, as used herein, "computer-readable media 920" can be singular or plural. For example, program code 918 can be located in computer-readable media 920 in the form of a single storage device or system. In another example, program code 918 can be located in computer-readable media 920 that is distributed in multiple data processing systems. In other words, some instructions in program code 918 can be located in one data processing system while other instructions in program code 918 can be located in one data processing system. For example, a portion of program code 918 can be located in computer-readable media 920 in a server computer while another portion of program code 918 can be located in computer-readable media 920 located in a set of client computers.

The different components illustrated for data processing system 900 are not meant to provide architectural limitations to the manner in which different embodiments can be implemented. In some illustrative examples, one or more of the components may be incorporated in or otherwise form a portion of, another component. For example, memory 906, or portions thereof, may be incorporated in processor unit 904 in some illustrative examples. The different illustrative embodiments can be implemented in a data processing system including components in addition to or in place of those illustrated for data processing system 900. Other components shown in FIG. 9 can be varied from the illustrative examples shown. The different embodiments can be implemented using any hardware device or system capable of running program code 918.

Thus, the illustrative embodiments of the present invention provide a computer-implemented method, computer system, and computer program product for forecasting a data anomaly to a supply chain. A plurality of data records is identified for a plurality of entities. The data records include import records and export records. The data fields in the data records are categorized into generic field types. The generic field types include numeric fields, categorical fields, and date fields. For each of the plurality of entities, an entity-specific model is constructed for forecasting imports and exports based on the generic field types. The entity-specific model for each of the plurality of entities is combined into a global supply chain model. Based on the global supply chain model, a data anomaly is forecast to a supply chain that is associated with a particular entity.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component can be configured to perform the action or operation described. For example, the component can have a configuration or design for a structure that provides the component an ability to perform the action or operation that is described in the illustrative examples as being performed by the component. Further, to the extent that terms "includes", "including", "has", "contains", and variants thereof are used herein, such terms are intended to be inclusive in a manner similar to the term "comprises" as an open transition word without precluding any additional or other elements.

The descriptions of the various embodiments of the present invention have been presented for purposes of illustration but are not intended to be exhaustive or limited to the embodiments disclosed. Not all embodiments will include all of the features described in the illustrative examples. Further, different illustrative embodiments may provide different features as compared to other illustrative embodiments. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

What is claimed is:

1. A computer-implemented method for forecasting a data anomaly to a supply chain, comprising:
    using a number of processors to perform the steps of:
        identifying a plurality of data records for a plurality of entities, the data records including import records and export records;
        categorizing data fields in a plurality of data records into generic field types, wherein the generic field types comprising numeric fields, categorical fields, and date fields;
        for each of a plurality of entities, constructing an entity-specific model for predicting data anomalies occurring at imports and exports of an entity based on the generic field types comprising:
            generating a first set of statistics about data fields from the plurality of data records; and
            controlling a data quality of the data records by identifying an anomalous record, comprising:
                generating a comparison based on the first set of statistics and a first set of data records;
                rejecting the first set of data record as the anomalous record when the comparison exceeds a difference threshold;
                generating a set of meta-statistics according to a generic field type for data fields from the first set of statistics and the first set of data records, wherein the set of meta-statistics are statistics relates to the first set of statistics; and
                generating the comparison based on the set of meta-statistics and the first set of data records, wherein comparisons generated based on the set of meta-statistics controls false positive rates to identify the anomalous record more accurately; and
            replacing the first set of statistics with a second set of statistics to compare with a second set of data records;
        combining the entity-specific model for each of the plurality of entities to create a global supply chain model for the plurality of entities; and
        forecasting, based on the global supply chain model, the data anomaly to a supply chain that is associated with a particular entity.

2. The method of claim 1, wherein the second set of statistics for numeric fields comprises:
    a percentile change for a data field from the first set of data records to the second set of data records;
    a percent change in a median for a data field from the first set of data records to the second set of data records;
    a maximum difference for a data field from the first set of data records to the second set of data records;
    a minimum difference for a data field from the first set of data records to the second set of data records; and
    negative values for a data field from the first set of data records to the second set of data records.

3. The method of claim 1, wherein the second set of statistics for categorical fields comprises:
    a percentage change in a number of categorical fields from the first set of data records to the second set of data record records;
    a percent agreement in categorical fields between the first set of data records and the second set of data records;
    a percentage of missing categorical fields between the first set of data records and the second set of data record records; and
    a modified chi-squared ratio for categorical fields.

4. The method of claim 1, wherein constructing the entity-specific model further comprises:
    for the particular entity, generating a first time series of import records for the particular entity according to the date fields therein; and
    for the particular entity, training a first machine learning model on the first time series for the particular entity and comparisons of a first set of statistics about data fields in the import records for the particular entity.

5. The method of claim 4, wherein combining the entity-specific model for each of the plurality of entities into a global supply chain model further comprises:
    for each of the plurality of entities, generating a second time series of export records according to the date fields therein;
    for each of the plurality of entities, training a second machine learning model on the second time series for the plurality of entities and comparisons of a second set of statistics about data fields in the export records for the plurality of entities; and
    generating the global supply chain model by externally regressing the first machine learning model for the particular entity with the second machine learning model for the plurality of entities.

6. The method of claim 1, wherein the comparisons generated based on the set of meta-statistics controls false positive rates of data anomalies by identifying data anomalies within a threshold derived from distribution of the set of meta-statistics.

7. The method of claim 1 further comprises:
    identifying a disruption in import and export of assets at the particular entity according to the forecasted data anomaly to the supply chain that is associated with the particular entity.

8. A computer system comprising:
    a storage device configured to store program instructions; and
    one or more processors operably connected to the storage device and configured to execute the program instructions to cause the computer system:
        to identify a plurality of data records for a plurality of entities, the data records including import records and export records
        to categorize data fields in the data records into generic field types, wherein the generic field types including numeric fields, categorical fields, and date fields;

for each of the plurality of entities, to construct an entity-specific model for predicting data anomalies occurring at imports and exports of a single entity based on the generic field types comprising:
to generate a first set of statistics about data fields from the plurality of data records; and
to control a data quality of the data records by identifying an anomalous record, comprising:
generating a comparison based on the first set of statistics and a first set of data records;
rejecting the first set of data record as the anomalous record when the comparison exceeds a difference threshold;
generating a set of meta-statistics according to a generic field type for data fields from the first set of statistics and the first set of data records, wherein the set of meta-statistics are statistics relates to the first set of statistics; and
generating the comparison based on the set of meta-statistics and the first set of data records, wherein comparisons generated based on the set of meta-statistics controls false positive rates to identify the anomalous record more accurately; and
to replace the first set of statistics with a second set of statistics to compare with a second set of data records;
to combine the entity-specific model for each of the plurality of entities into a global supply chain model; and
to forecast, based on the global supply chain model, the data anomaly to a supply chain that is associated with a particular entity.

9. The computer system of claim 8, wherein the second set of statistics for numeric fields comprises:
a percentile change for a data field from the first set of data records to the second set of data records;
a percent change in a median for a data field from the first set of data records to the second set of data records;
a maximum difference for a data field from the first set of data records to the second set of data records;
a minimum difference for a data field from the first set of data records to the second set of data records; and
negative values for a data field from the first set of data records to the second set of data records.

10. The computer system of claim 8, wherein the second set of statistics for categorical fields comprises:
a percentage change in a number of categorical fields from the first set of data records to the second set of data record records;
a percent agreement in categorical fields between the first set of data records and the second set of data records;
a percentage of missing categorical fields between the first set of data records and the second set of data record records; and
a modified chi-squared ratio for categorical fields.

11. The computer system of claim 8, wherein in constructing the entity-specific model, the processors further execute program instructions:
for the particular entity, to generate a first time series of import records for the particular entity according to the date fields therein; and
for the particular entity, to train a first machine learning model on the first time series for the particular entity and comparisons of a first set of statistics about data fields in the import records for the particular entity.

12. The computer system of claim 11, wherein in combining the entity-specific model for each of the plurality of entities into a global supply chain model, the processors further execute program instructions:
for each of the plurality of entities, to generate a second time series of export records according to the date fields therein;
for each of the plurality of entities, to train a second machine learning model on the second time series for the plurality of entities and comparisons of a second set of statistics about data fields in the export records for the plurality of entities; and
to generate the global supply chain model by externally regressing the first machine learning model for the particular entity with the second machine learning model for the plurality of entities.

13. The computer system of claim 8, wherein the comparisons generated based on the set of meta-statistics controls false positive rates of data anomalies by identifying data anomalies within a threshold derived from distribution of the set of meta-statistics.

14. The computer system of claim 8, wherein processor units further executes the program instructions to:
identifying a disruption in import and export of assets at the particular entity according to the forecasted data anomaly to the supply chain that is associated with the particular entity.

15. A computer program product comprising:
a computer readable storage media; and
program code, stored on the computer readable storage media, for forecasting a data anomaly to a supply chain, the program code comprising:
program code for identifying a plurality of data records for a plurality of entities, the data records including import records and export records;
program code for categorizing data fields in the data records into generic field types, wherein the generic field types including numeric fields, categorical fields, and date fields;
program code for constructing, for each of the plurality of entities, an entity-specific model for predicting data anomalies occurring at imports and exports of a single entity based on the generic field types comprising:
program code for generating a first set of statistics about data fields from the plurality of data records; and
program code for controlling a data quality of the data records by identifying an anomalous record, comprising:
program code for generating a comparison based on the first set of statistics and a first set of data records;
program code for rejecting the first set of data record as the anomalous record when the comparison exceeds a difference threshold;
program code for generating a set of meta-statistics according to a generic field type for data fields from the first set of statistics and the first set of data records, wherein the set of meta-statistics are statistics relates to the first set of statistics; and
program code for generating the comparison based on the set of meta-statistics and the first set of data records, wherein comparisons generated based on the set of meta-statistics controls false positive rates to identify the anomalous record more accurately; and
program code for replacing the first set of statistics with a second set of statistics to compare with a second set of data records;

program code for combining the entity-specific model for each of the plurality of entities to create a global supply chain model for the plurality of entities; and program code for forecasting, based on the global supply chain model, the data anomaly to a supply chain that is associated with a particular entity.

16. The computer program product of claim 15, wherein the second set of statistics for numeric fields comprises:
   a percentile change for a data field from the first set of data records to the second set of data records;
   a percent change in a median for a data field from the first set of data records to the second set of data records;
   a maximum difference for a data field from the first set of data records to the second set of data records;
   a minimum difference for a data field from the first set of data records to the second set of data records; and
   negative values for a data field from the first set of data records to the second set of data records.

17. The computer program product of claim 15, wherein the second set of statistics for categorical fields comprises:
   a percentage change in a number of categorical fields from the first set of data records to the second set of data record records;
   a percent agreement in categorical fields between the first set of data records and the second set of data records;
   a percentage of missing categorical fields between the first set of data records and the second set of data record records; and
   a modified chi-squared ratio for categorical fields.

18. The computer program product of claim 15, wherein the program code for constructing the entity-specific model further comprises:
   program code for generating, for the particular entity, a first time series of import records for the particular entity according to the date fields therein; and
   program code for training, for the particular entity, a first machine learning model on the first time series for the particular entity and comparisons of a first set of statistics about data fields in the import records for the particular entity.

19. The computer program product of claim 18, wherein the program code for combining the entity-specific model for each of the plurality of entities into a global supply chain model further comprises:
   program code for generating, for each of the plurality of entities, a second time series of export records according to the date fields therein;
   program code for training, for each of the plurality of entities, a second machine learning model on the second time series for the plurality of entities and comparisons of a second set of statistics about data fields in the export records for the plurality of entities; and
   program code for generating the global supply chain model by externally regressing the first machine learning model for the particular entity with the second machine learning model for the plurality of entities.

20. The computer program product of claim 18, wherein the comparisons generated based on the set of meta-statistics controls false positive rates of data anomalies by identifying data anomalies within a threshold derived from distribution of the set of meta-statistics.

21. The computer program product of claim 18, wherein the program code comprising further comprises:
   program code for identifying a disruption in import and export of assets at the particular entity according to the forecasted data anomaly to the supply chain that is associated with the particular entity.

* * * * *